(12) United States Patent
Roach et al.

(10) Patent No.: US 7,283,933 B2
(45) Date of Patent: Oct. 16, 2007

(54) EFFICIENCY MONITOR

(75) Inventors: Jeffrey M. Roach, St. Charles, MO (US); James J. Sheahan, Jr., Florissant, MO (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 11/359,740

(22) Filed: Feb. 22, 2006

(65) Prior Publication Data

US 2007/0198225 A1    Aug. 23, 2007

(51) Int. Cl.
*G06F 11/00* (2006.01)
*G21C 17/00* (2006.01)
(52) U.S. Cl. ...................................... 702/182
(58) Field of Classification Search ............... 702/182
See application file for complete search history.

(56) References Cited

U.S. PATENT DOCUMENTS

| | | | |
|---|---|---|---|
| 5,092,539 A | 3/1992 | Caero | |
| 5,262,717 A | 11/1993 | Bolegoh | |
| 5,422,834 A * | 6/1995 | Horiuchi et al. | 703/7 |
| 6,362,744 B1 | 3/2002 | Benke et al. | |
| 6,446,519 B1 | 9/2002 | Biester | |
| 6,453,761 B1 | 9/2002 | Babinski | |
| 6,529,135 B1 | 3/2003 | Bowers et al. | |
| 6,745,151 B2 | 6/2004 | Marko et al. | |
| 6,834,256 B2 | 12/2004 | House et al. | |

FOREIGN PATENT DOCUMENTS

DE    19963279    6/2001

OTHER PUBLICATIONS

U.S. Appl. No. 11/291,709, filed Dec. 1, 2005, Blanding et al.
European Search Report, Application No.: GB0702685.9 dated Apr. 19, 2007.

* cited by examiner

*Primary Examiner*—John Barlow
*Assistant Examiner*—Cindy D. Khuu
(74) *Attorney, Agent, or Firm*—Harness, Dickey & Pierce, P.L.C.

(57) ABSTRACT

A system and method for monitoring a reliability status of an actuator include determining a virtual actuator load value (VALV) based on various load factor parameters of a structural system component controlled by the actuator, absent sensed load values from the actuator. A virtual output force value (VOFV) is determined based on various actuator operational control values that occur in response to a position command from a main control and monitoring system of the structural system. A virtual torque efficiency (VTE) of the actuator is calculated based on the VALV and the VOFV. The VTE of the actuator is periodically calculated as the measured load factor parameters and the measured actuator operational control values change during operation of the structural system. The VTE data is collected, stored and analyzed to monitor the reliability status of the actuator during the life of the actuator.

20 Claims, 6 Drawing Sheets

EFFICIENCY MONITOR

GOVERNMENT RIGHTS IN THE INVENTION

This invention was made with Government support under contract F33615-03-2-2306, awarded by the United State Air Force. The Government has certain rights in this invention.

FIELD OF THE INVENTION

The present invention relates to electro-mechanical actuators and more particularly to an efficiency monitor for an electro-mechanical actuator.

BACKGROUND OF THE INVENTION

Concern about jamming within an actuator, such as an electro-mechanical actuator (EMA), has hindered the acceptance of actuators for use in various structural systems, e.g., mobile platforms. For example, such a jammed actuator that controls the movement of a primary flight control surface of an aircraft can create a potentially very dangerous safety situation for the aircraft. Empirical data strongly suggests that degradation of the actuator mechanism is gradual. But, typically, such data does not provide health data, i.e., periodic wear status data, of the actuator during the useful life of the actuator. Systems that monitor the health of actuators, may include numerous dedicated sensors to monitor various actual actuator loads, characteristics, parameters and conditions. Such sensors would add significantly to the cost and complexity of the actuator and ultimately reduce reliability of the actuator.

SUMMARY OF THE INVENTION

In various embodiments, the present invention provides a system and method for monitoring a reliability status of an actuator, for example, an electro-mechanical actuator (EMA). The method includes determining a virtual actuator load value (VALV) based on various load factor parameters of a structural system component controlled by the actuator, .e.g., a control surface of a mobile platform. The load factor parameters are acquired absent sensed load values from the actuator. The method additionally includes determining a virtual output force value (VOFV) based on various actuator operational control values that occur in response to a torque command from a main control and monitoring system of the structural system. Furthermore, the method includes calculating a virtual torque efficiency (VTE) of the actuator based on the VALV and the VOFV. The VTE is periodically calculated, e.g., 100 times per second, as the measured load factor parameters and the measured actuator operational control values change during operation of the structural system. The VTE data is collected, stored and analyzed to monitor the reliability status of the actuator during the life of the actuator.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
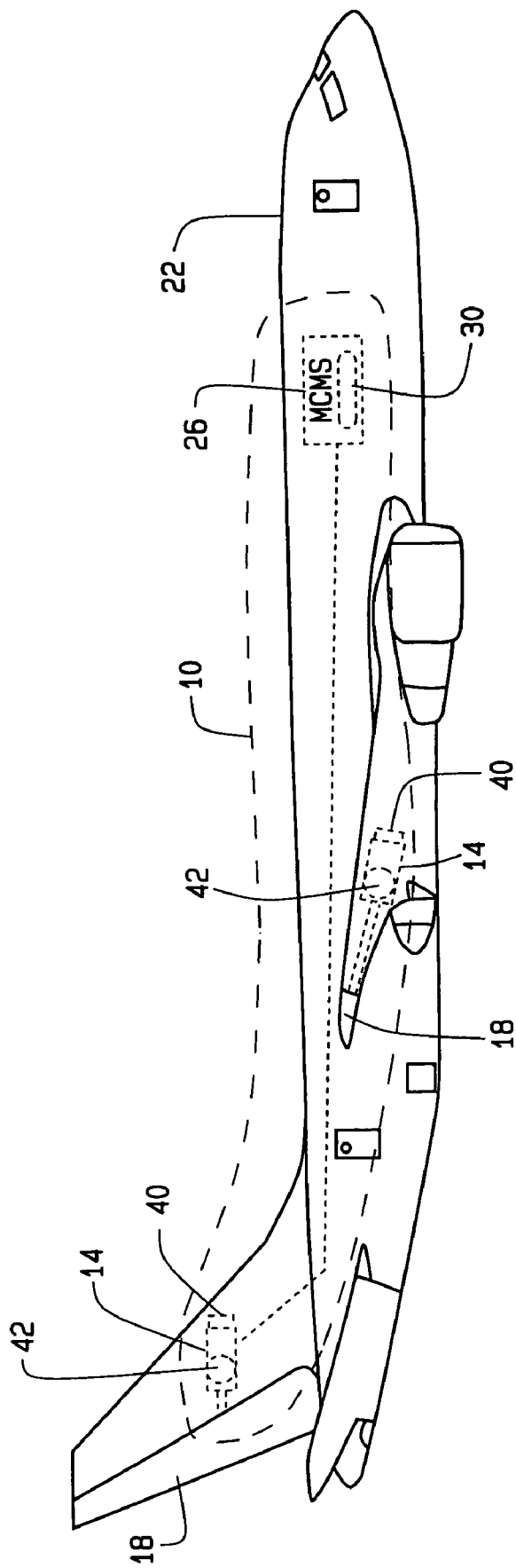
FIG. 1 is an illustration of a structural system including a reliability status monitoring system for at least one actuator, in accordance with various embodiments of the present invention.

Referring to FIG. 1, in various embodiments, a reliability status monitoring system 10 is provided for monitoring the reliability status of at least one actuator 14, for example an electro-mechanical actuator (EMA), a digital linear motor or any other electrical motor driven system with a positional output. Each actuator 14 controls the movement of at least one component 18 of a structural system 22, such as a mobile platform. For example, each actuator 14 can control the movement of a control surface of an aircraft. Although the structural system 22 is exemplarily illustrated in FIG. 1 as an aircraft, the structural system 22 is not limited to aircraft or other mobile platforms such buses, ships, trains or other vehicles. The structural system 22 can be any structural system that incorporates one or more actuators 14 to control the movement of at least one component 18 of the structural system 22. For example, the structural system 22 could be a heating, ventilation and air conditioning system that incorporate one or more actuators 14 to control the movement of one or more louvers, shutters, turrets or valves to control the direction and/or volume of air flow. Furthermore, although each actuator 14 is exemplarily illustrated in FIG. 1 as a single actuator, it should be understood that the reliability status monitoring system 10 can be utilized to monitor the reliability status of a plurality of interconnected actuators 14. For example, a plurality of interconnected actuators 14 can be incorporated to provide redundancy and/or added control of the structural component(s) 18, and remain within the scope of the invention.

The reliability status monitoring system 10 includes the one or more actuators 14 and a main control and monitoring system (MCMS) 26 of the structural system 22 that controls and/or monitors various operations of the structural system 22. For example, the main control and monitoring system 26 can be the main computer-based aircraft management system of an aircraft that controls such things as transmission of pilot commands and monitors such things as air speed, gravitational forces on the aircraft and amount of deflection of various aircraft control surfaces. Although it should be understood that the reliability status monitoring system 10 can be employed to monitor the reliability status of one or more actuators 14, for simplicity and clarity, the one or more actuators 14 will generally be referred to herein in the singular, i.e., simply as the actuator 14. Similarly, although it should be understood that each actuator 14 can be operatively connected to one or more components 18, for simplicity and clarity, the one or more components 18 will generally be referred to herein in the singular, i.e., simply as the component 18.

Figure 2:
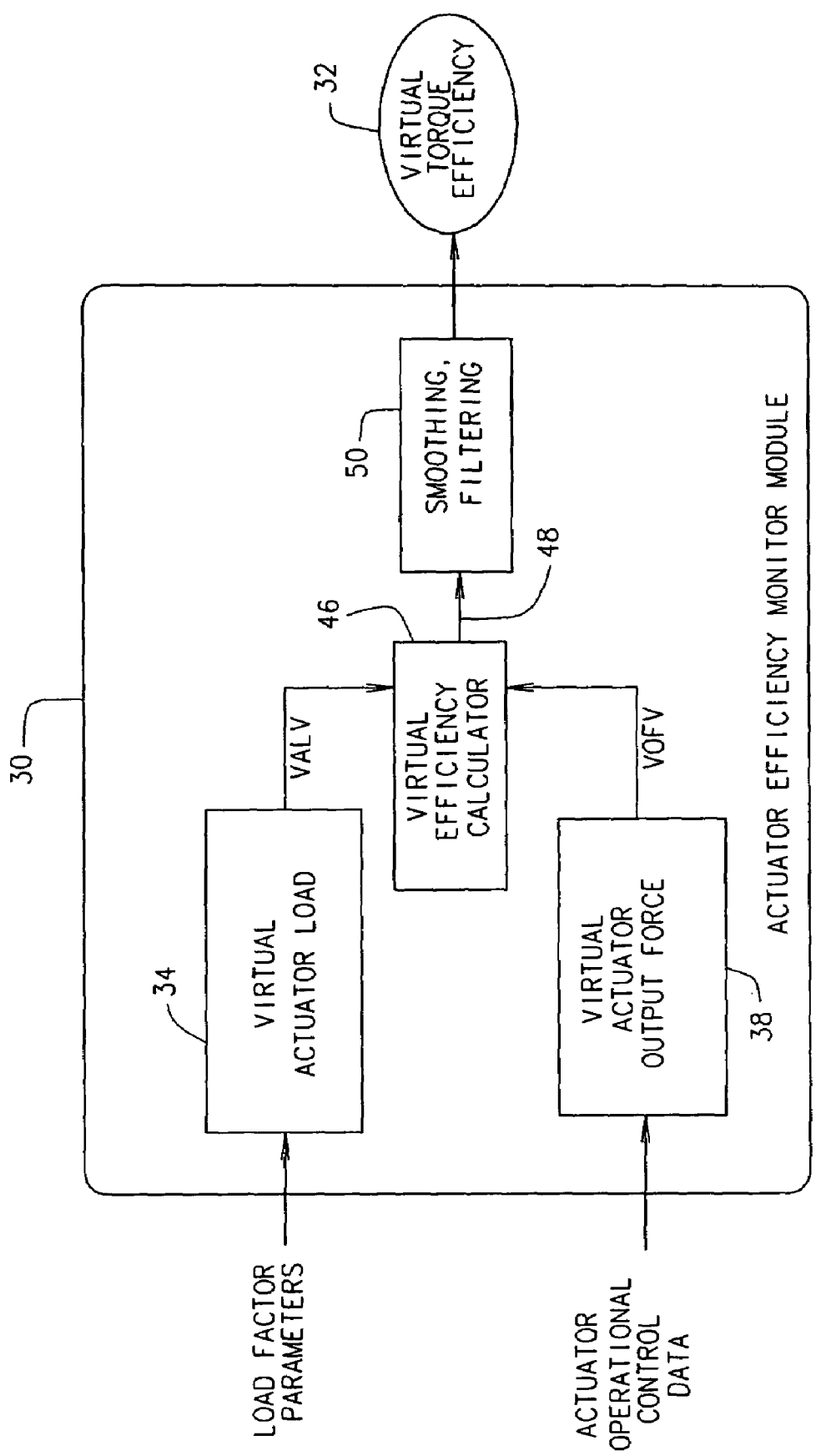
FIG. 2 is a block diagram illustrating an actuator efficiency monitor module included in the reliability status monitoring system shown in FIG. 1.

Referring to FIG. 2, the reliability status monitoring system 10 additionally includes an actuator efficiency module 30 that is a software based module executable by any suitable processor or microprocessor. For example, in various embodiments, the actuator efficiency module 30 can be included in the MCMS 26 and executed by an MCMS processor (not shown). Accordingly, for illustration purpose only, the actuator efficiency module 30 is shown in FIG. 1 as being included in the MCMS 26, but could be included as part of any other computer-based subsystem of the structural system 22 or remote computer-based system communicatively connected to the MCMS 26 via wired or wireless communication. The actuator efficiency module 30 provides a software model for determining a virtual torque efficiency of the actuator 14 by comparing a virtual actuator output force to a virtual actuator load generated using previously compiled surface load model calculations Generally, the actuator efficiency module 30 acquires or receives various measured load factor parameters of the structural component 18 that do not include actual measured load values of the actuator 14. Based on the various measured load factor parameters the actuator efficiency module 30 generates a virtual actuator load value (VALV). Similarly, the actuator efficiency module 30 acquires or receives various measured operational control values of the actuator, and based on the various measured operational control values of the actuator, generates a virtual output force value (VOFV) of the actuator 14. Based on the VALV and the VOFV, the actuator efficiency module 30 calculates an approximate virtual torque efficiency (VTE) 32 of the actuator 14. The actuator efficiency module 30 repeatedly calculates the VTE 32 in accordance with a desired frequency, e.g., 100 Hz or 100 times per second, as the measured load factor parameters and actuator operational control values change in response to changing operational and environmental conditions of the structural system change. Thus, the VTE 32 can be tracked and analyzed to track trends and/or determine the reliability status of the actuator 14 during the life of the actuator 14. For example, over time, as the actuator 14 is utilized and incurs wear, the VTE 32 will decrease helping to identify projected points of failure, and providing an indicator of when to replace or repair the actuator 14 prior to failure.

More particularly, in various embodiments, the actuator efficiency module 30 includes a virtual actuator load module or routine 34 that utilizes the various measured load factor parameters to generate the VALV. The measured load factor parameters are provided to the actuator efficiency module from the MCMS 26. Execution of the virtual actuator load module 34 generates the VALV based on the input load factor parameters, as described further below. The load factor parameters are actual measured parameters that effect or factor into the actual surface load exerted on the component 18 and thus, the load exerted on the actuator 14 during operation of the structural system 22. More specifically, the load factor parameters do not include values of actual sensed and measured load exerted on the actuator 14, but rather include values measured by the MCMS 26 that effect the actual resulting load exerted on the actuator 14. Thus, the actuator efficiency module 30 utilizes the load factor parameters to generate a mathematically estimated, non-actual, actuator load that is not based on actual measurements from dedicated force sensors of the load exerted on the actuator 14 by various forces imparted on the structural component 18.

For example, in various embodiments the load factor parameters include such data as an amount of gravitational force acting on the component 18, a speed at which the structural system 22 is moving, if the structural system is moving, and/or an amount of surface deflection of component 18 operatively connected the actuator 14. In an exemplary embodiment wherein the structural system 22 is a mobile platform, the load factor parameters can include such data as an amount of gravitational force acting on a mobile platform control surface, a speed at which the mobile platform is moving, and/or an amount of surface deflection of a mobile platform control surface operatively connected the actuator 14. In a further exemplary embodiment, the mobile platform can comprise an aircraft such that the load factor parameters can include such data as an angle of attack, a speed at which the aircraft is moving relative to the speed of sound (Mach number), dynamic pressure, i.e., the difference between the total pressure and the static pressure, and/or an amount of surface deflection of an aircraft control surface operatively connected the actuator 14.

As described further below, the virtual actuator load module 34 generates the VALV utilizing surface load, i.e., actuator 14 load, data previously compiled using surface load modeling. The surface load modeling computes loads exerted on the actuator 14 by forces or loads exerted on the surface of the component 18 using simulation testing. For example, if the component 18 was a flight control surface of an aircraft, the surface load model would compute loads exerted on the actuator 14 using wind tunnel and flight-testing that utilizes aerodynamic data acquired by the aircraft to estimate the load applied to the actuator 14. Accordingly, the utilization of the previous compiled surface load data during execution of the virtual actuator load module 34 eliminates the need for a dedicated force sensor to be added to the actuator 14.

In various embodiments, the actuator efficiency module 30 additionally includes a virtual actuator output force module or routine 38 that utilizes the various measured operational control values of the actuator 14 to generate the VOFV. More specifically, the MCMS 26 sends position commands to an actuator controller 40 that controls the operation of the actuator 14 to move the component 18 to a desired position. Particularly, in response to the position command, the actuator controller 40 controls the operation of a drive motor 42 (shown in FIG. 1) included in the actuator 14 that operates to move an output ram connected to the component 18 to impart movement of the component 18. In various other embodiments, the MCMS 26 can send other control commands to control the operation of the drive motor 42, such as velocity commands, accelerations commands and/or current commands, such as those used in an error based closed loop control scheme. As described further below, during operation of the actuator 14, the actuator controller 40 measures the operational control values and inputs the values to the actuator efficiency module 30. Execution of the virtual actuator output force module 38 generates the VOFV based on the input operational control values. In various embodiments, the operational control values include such data as a pulse width modulation (PWM) signals input to the drive motor 42, a rotational speed of the motor 42 and an applied voltage to the motor 42.

The actuator efficiency module 30 further includes a virtual efficiency calculation module or routine 46 that receives as input the VALV and the VOFV. Utilizing the VALV and the VOFV, the virtual efficiency calculation module 46 generates an approximate virtual torque efficiency 48 of the actuator 14. For example, execution of the virtual efficiency calculation module 46 divides the VALV (the dividend) by the VOFV (the divisor) to generate a quotient representative of the virtual torque efficiency of the actuator. In various embodiments, the actuator efficiency module 30 further includes a smoothing and/or filtering module or routine 50 that modifies the approximate virtual torque efficiency 48 generated by the virtual efficiency calculation module 46 to compensate for aiding and/or resisting force that can be exerted on the component 18. For example, air flow across the component 18 can increase or decrease the load imparted on the component 18 and thereby aid or resist the movement imparted by the drive motor 42 on the component 18. Filtering or smoothing the approximate virtual torque efficiency 48 results in the smoothing/filtering module 50 outputting the virtual torque efficiency (VTE) 32.

As described above, the actuator efficiency module 30 repeatedly calculates the VTE 32 in accordance with a desired frequency, e.g., 100 Hz or 100 times per second, as the measured load factor parameters and actuator operational control values change in response to changing operational and environmental conditions of the structural system change. In various embodiments, the plurality of VTE data is output from the actuator efficiency module 30 and stored in any suitable electronic storage or memory device. For example, in various implementations the plurality of VTE data is output to the MCMS 26 and stored in a database within data storage device (not shown) of the MCMS 26. Subsequently, the VTE data can be analyzed via the MCMS 26 or transmitted, via wired or wireless transmission, to a remote computer-based system for analysis. Therefore, the VTE data can be tracked and analyzed to track trends and/or determine the reliability status of the actuator 14 during the life of the actuator 14 to identify projected points of failure, and provide an indicator of when to replace or repair the actuator 14 prior to failure.

Figure 3:
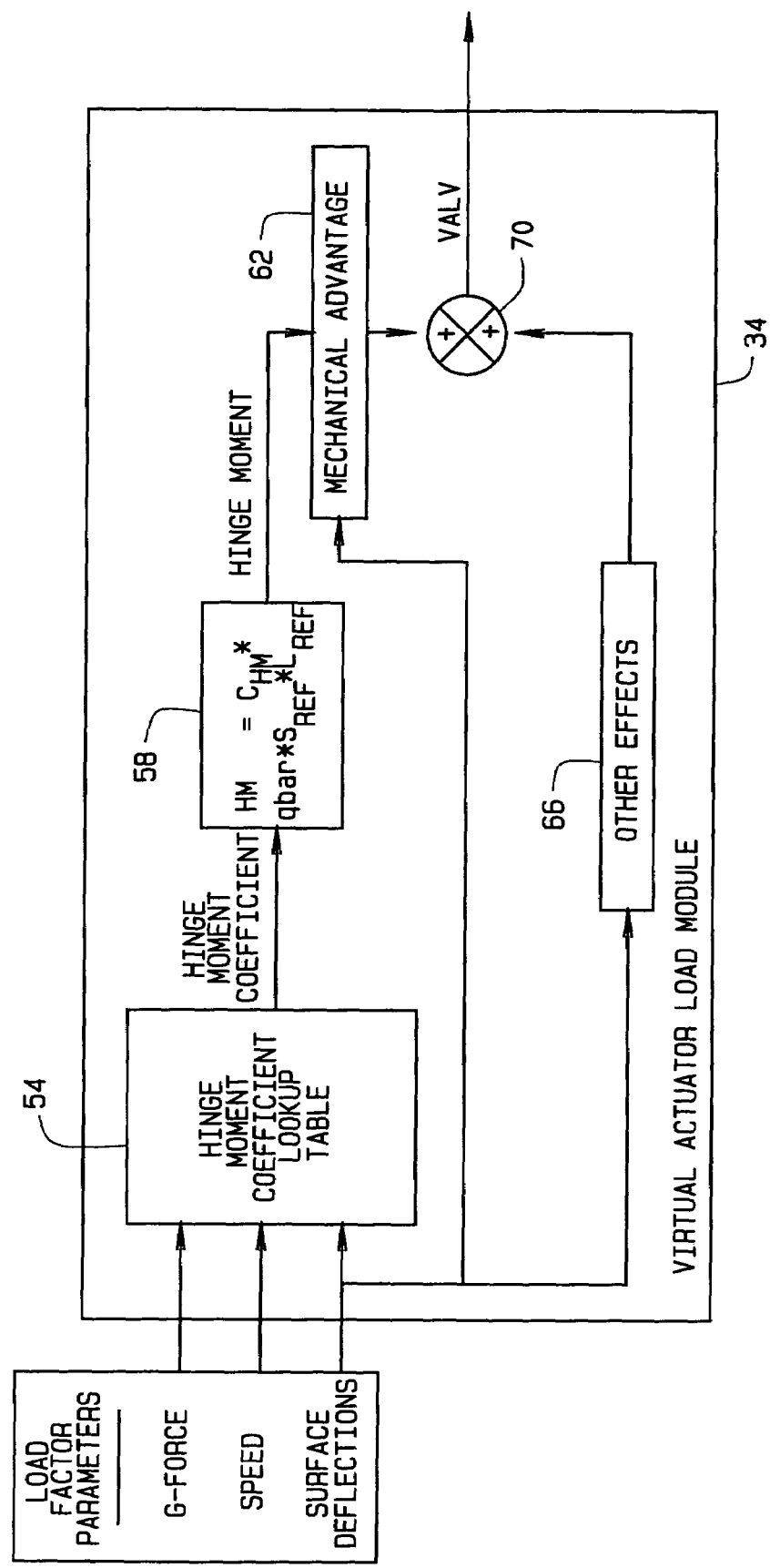
FIG. 3 is a block diagram illustrating at least a portion of a virtual actuator load module included in the actuator efficiency monitor module shown in FIG. 2, in accordance with various embodiments of the present invention.

Referring now to FIG. 3, in various embodiments, the virtual actuator load module 34 includes a hinge moment coefficient lookup table 54, a hinge moment module 58, a mechanical advantage module 62 an other effects module 66 and a summer 70. The virtual actuator load module 34 receives the load factor parameters, e.g., gravitational force, speed and surface deflection, and inputs the load factor parameters to the hinge moment coefficient lookup table 54. The hinge moment coefficient lookup table 54 includes the previously compiled surface load model calculations described above. The hinge moment coefficient lookup table 54 generates a hinge moment coefficient based on the load factor parameters and data identifying the particular structural system 22 in which the actuator 14 is included, and specific structural and operational characteristics of the particular structural system 22.

The structural system identification and characteristic data can be hard coded into the hinge moment coefficient lookup table 54 or received as inputs from a remote source, e.g., the MCMS 26. The hinge moment coefficient table 54 takes into consideration the load/force effects the structural system identification and characteristic data may have on the load/force exerted on the component 18. That is, utilizing the structural system identification and characteristic data, the hinge moment lookup table can consider the effects that other structural system surfaces adjacent the component 18 may have on the load/force exerted on the component 18. For example, the hinge moment lookup table 54 can take into consideration the aerodynamic influences that adjacent surfaces of the component 18 can have in the surface load of the component 18. Then, based on the structural system identification and characteristic data and the load factor parameter inputs, the hinge moment coefficient table 54 generates a hinge moment coefficient ($C_{HM}$) for the component 18 that is input to the hinge moment module 58.

The hinge moment module 58 utilizes the hinge moment coefficient to generate a hinge moment value, i.e., the amount of torque about a hinge line of the component 18. In various embodiments, the hinge moment (HM) is generated using the equation $HM=C_{HM}*qbar*S_{REF}*L_{REF}$, wherein qbar is equal to dynamic pressure on the surface of the component 18, $S_{REF}$ is equal to surface area of the component 18 and $L_{REF}$ is equal to the distance the center of pressure or force on the component 18 is from the hinge line of the component 18. The hinge moment HM is output to the mechanical advantage module 62 that can also receive as an input the surface deflection value. The mechanical advantage module 62 adds the hinge moment HM to the product of the surface deflection and the effective moment arm between the actuator 14 and the component 18 it is driving. The other effects module 66 multiplies the surface deflection by other loads on the component 18 surface, such as friction with a linkage mechanism between the actuator output ram and the component 18, and/or spring loads created along the hinge line of the component 18 resulting from the particular structural design configuration of the component 18. The outputs of the mechanical advantage module 62 and the other effects module 66 are added at summer 70 to generate the VALV output from the virtual actuator load module 34.

Figure 4:
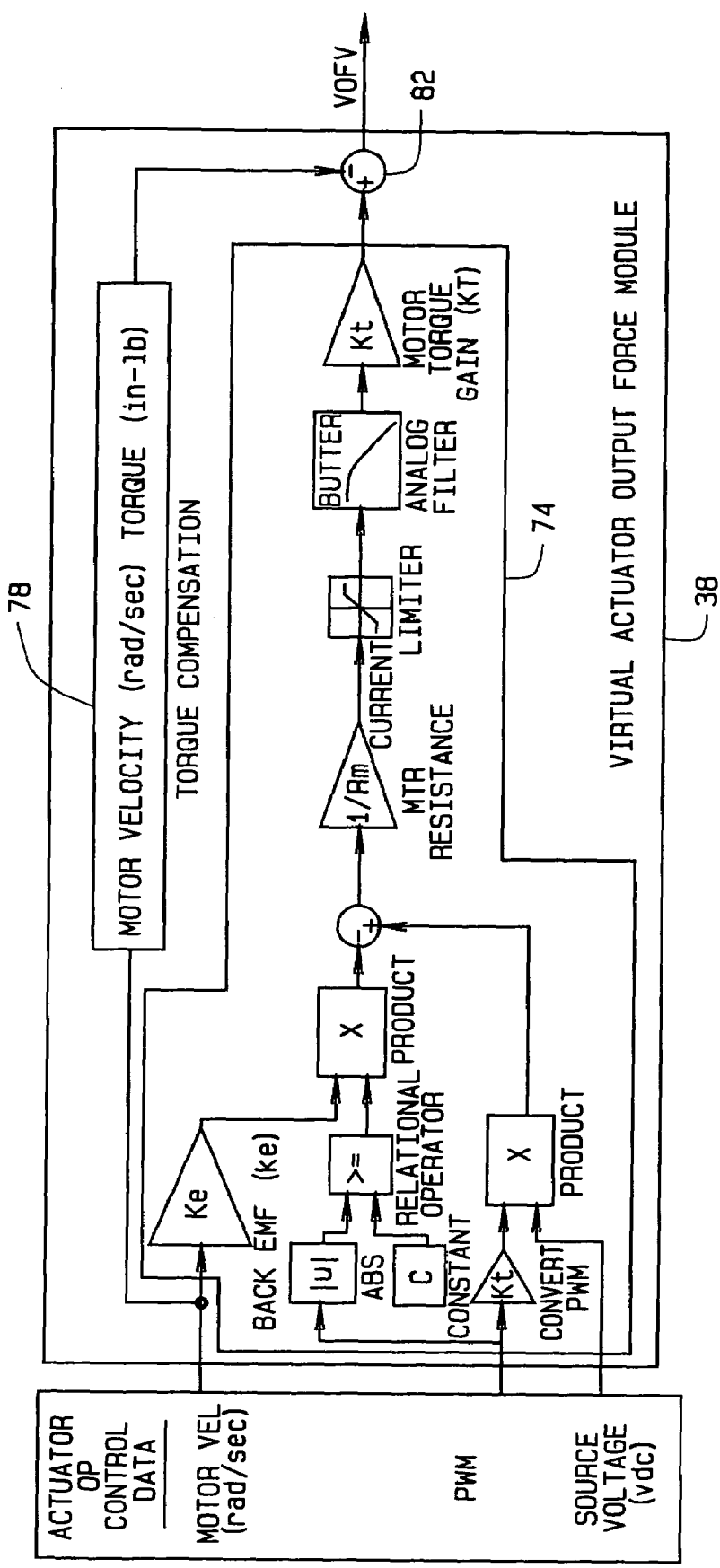
FIG. 4 is a block diagram illustrating at least a portion of a virtual actuator output force module included in the actuator efficiency monitor module shown in FIG. 2, in accordance with various embodiments of the present invention.

Referring now to FIG. 4, in various embodiments, the virtual actuator output force module 38 includes an actuator motor analysis module 74, a torque compensation module 78 and a summer 82. The virtual actuator output force module 38 receives the actuator operational control values, e.g., the rotational velocity of the drive motor 42, the PWM signal input to the drive motor 42, and the applied voltage to the drive motor 42, and inputs the values to the actuator motor analysis module 74. The PWM is generally derived from the error between the position command from the MCMS 26 and the actuator position feedback to the actuator controller 40. The motor velocity, e.g., rotational speed, and the applied or source voltage are input to the actuator motor analysis module 74 from the actuator controller 40. In various embodiments, the source voltage can be considered constant if long term voltage variations are small, which is common in typical mobile platforms, e.g., aircraft. The actuator motor analysis module 74 utilizes the actuator operational control values to perform motor modeling operations to generate a commanded motor torque value output to the summer 82. In various embodiments, the actuator motor analysis module 74 performs motor modeling operations in accordance with the block diagram shown in FIG. 4, wherein $K_e$ equals a back EMF coefficient of the drive motor 42, Rm equals electrical resistance of the drive motor 42 and Kt equals a torque coefficient of the drive motor 42. Additionally, the virtual actuator output force module 38 accounts for free wheeling of the drive motor 42.

Figure 5:
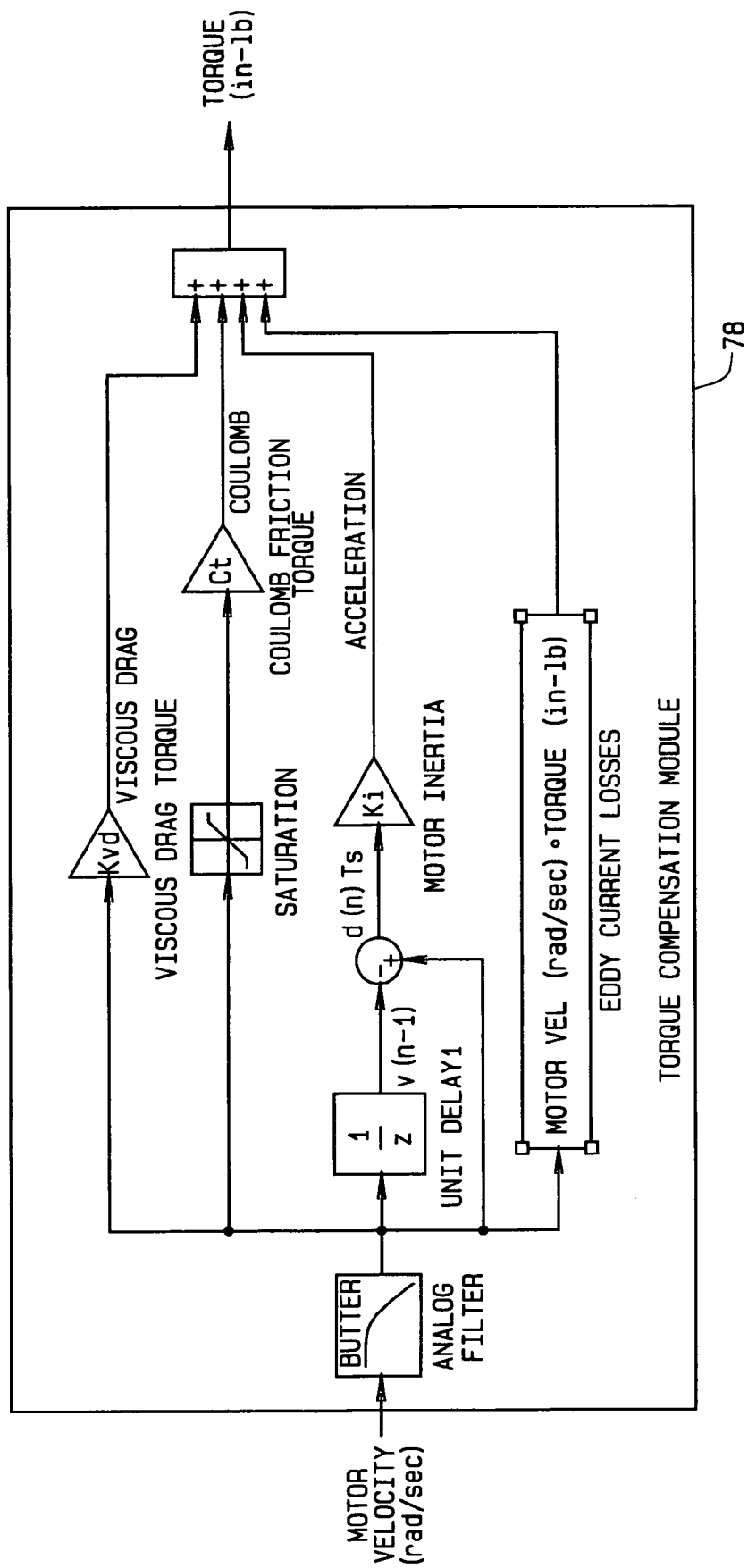
FIG. 5 is a block diagram illustrating at least a portion of a torque compensation module included a virtual actuator output force module of the virtual actuator output force module shown in FIG. 2, in accordance with various embodiments of the present invention.

The summer 82 applies the output of the torque compensation module 78 to the commanded motor torque output from the actuator motor analysis module 74 to account for known electrical, mechanical and acceleration related losses of the drive motor 42. In various embodiments, these losses are computed in accordance with the block diagram illustrated in FIG. 5, wherein Kd equals a viscous drag torque coefficient of the drive motor 42, Ct is Coulomb friction torque of the drive motor 42 and Ki equals a inertia coefficient of the drive motor 42. In various other embodiments, computation of such losses includes consideration of gear efficiency losses that can vary due to drive motor 42 speed and load. Inclusion of the gear efficiency losses in the calculation of the VOFV can be implemented in the form of a lookup table utilizing drive motor 42 speed and estimated load input and outputting a torque value that will be subtracted from the electrical torque output of the motor to generate the output of the torque compensation module 78. In various implementations, the torque compensation module 78 includes an Eddy current losses module 86 to compensate for losses that result from oscillating currents in the drive motor 42. The output of the torque compensation module is a torque value input to the summer 82 of the virtual actuator output force module 38 to generate the VOFV.

Figure 6:
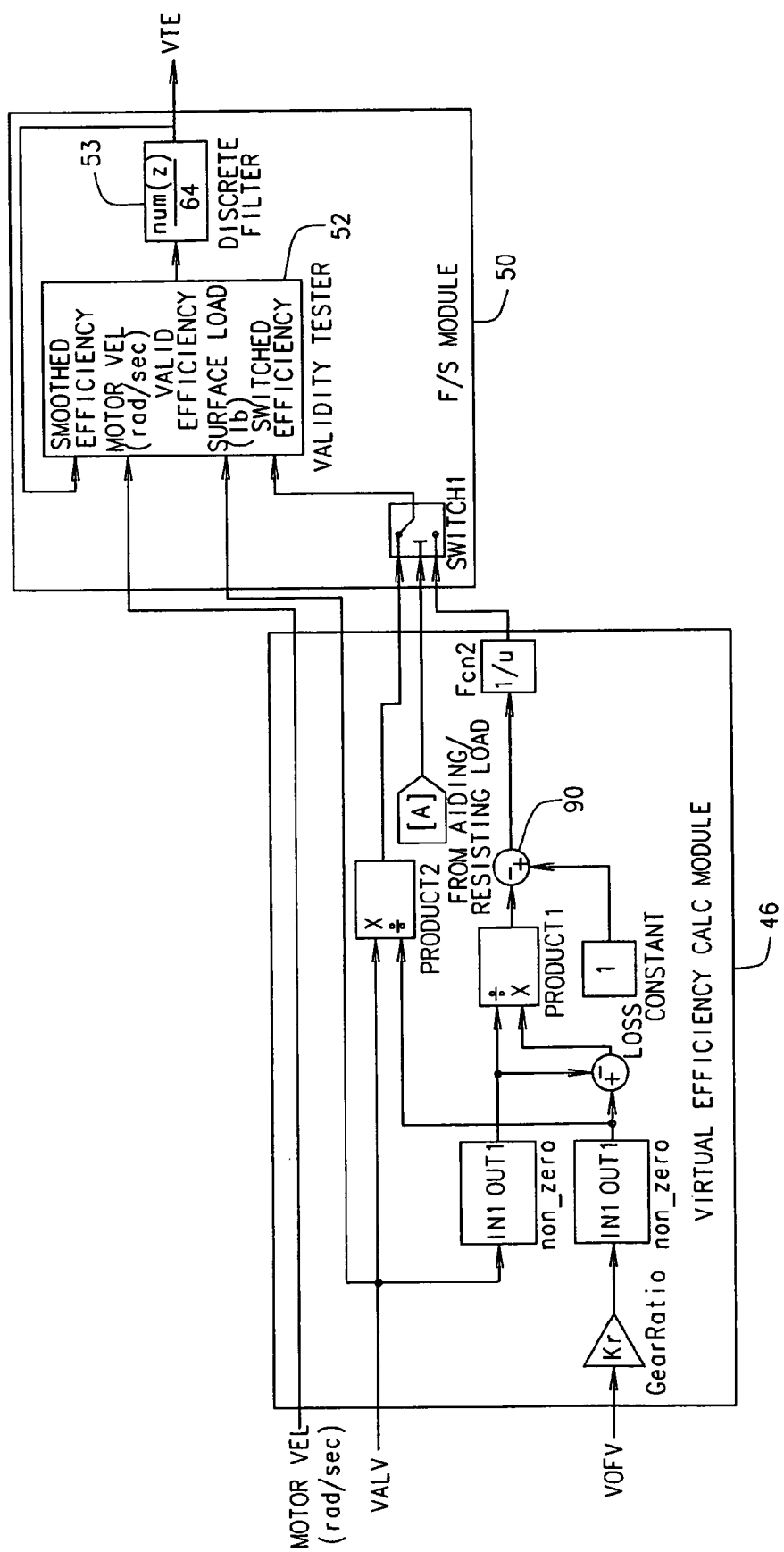
FIG. 6 is a block diagram illustrating at least a portion of a virtual efficiency calculator module and at least a portion of a smoothing/filtering module included the virtual actuator output force module shown in FIG. 2, in accordance with various embodiments of the present invention.

Referring now to FIG. 6, in various embodiments, the virtual efficiency calculator module 46 generates the approximate virtual torque efficiency in accordance with the block diagram illustrated in FIG. 6, wherein Kr equals a gear ratio coefficient for the actuator 14 based on the ratio between drive motor 42 rotation and linear displacement of the output ram, is a logic signal indicative of whether the actuator 14 is under an aiding or resisting load, and 1/u inverts the output of a summer. Since the actuator efficiency monitor module 30 is intended to be a real time monitor, the loads exerted on the actuator 14 by the surface loads on the component 18 can frequently cross zero. The non-zero blocks are adapted to prevent division by zero within the virtual efficiency calculation module 46. Thus, the outputs of the non-zero blocks will always be a negative or positive value.

Additionally, in various embodiments, the filtering/smoothing module 50 receives the output of the virtual efficiency calculator module 46 and generates the VTE in accordance with the block diagram illustrated in FIG. 6. The logic signal output from the block of the virtual efficiency calculation block that is indicative of whether the actuator 14 is under an aiding or resisting load, is input to a switch 1 block of the filtering/smoothing module 50. In response to the logic signal the switch 1 switches the filtering/smoothing module 50 between a resistive load VTE calculation mode and an aiding load VTE calculation. When in the resistive load VTE calculation mode, the filtering/smoothing module 50 outputs a reverse drive VTE. Conversely, when in the aiding load VTE calculation mode, the filtering/smoothing module 50 outputs a forward drive VTE. In various embodiments, the filtering/smoothing module 50 a validity tester module 52 and a discrete filter 53. The validity tester module 52 is used to limit the calculation of efficiency to only the range of input data where validation testing was conducted or where the most reliable data is produced. As an example, despite best efforts to accurately model the system, efficiency data may be erratic at high or low velocities and loads. The discrete filter 53 is simply a point moving average, e.g., a 64 point moving average. For example, the discrete filter 53 could be, a low pass filter, weighted moving average filter, or any mathematical method intended to eliminate any unintended variation due to noise in the data and to smooth the output signal such that the rate of change of the output signal to real failure events matches the detection time requirements of the structural system 22 the monitoring system 10 is used in. For example, if a 20% change in efficiency must be detected in 10 second, the filter must be set up to provide a 20% change in output signal over less than 10 seconds.

Therefore, in various embodiments, the present invention provides an actuator efficiency monitoring system that uses data readily available to the MCMS 26 to monitor and compare the virtual actuator load value to the virtual output force value. The comparison is then utilized to calculate the virtual torque efficiency of the actuator 14. Simple calculation methods are implemented that simplify and minimize computation requirements. Accordingly, the actuator efficiency monitoring module 30 provides degradation status to mobile platform personal, e.g., mobile platform operators and maintenance personal, thereby providing time to plan replacement or repair of the actuator 14.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for monitoring a reliability status of an actuator, said method comprising:
measuring various load factor parameters acting on a structural system component operably connected to and controlled by the actuator;
determining a virtual actuator load value (VALV) based on the various load factor parameters acting on the structural system component controlled by the actuator;
measuring various actuator operational control values that occur in response to a torque command to the actuator during operation of the actuator;
determining a virtual output force value (VOFV) based on the various actuator operational control values
comparing the VALV with the VOFV to calculate a virtual torque efficiency (VTE) of the actuator; and
storing the VTE in a computer readable database for future access, analysis and determination of a reliability status of the actuator.

2. The method of claim 1, wherein determining the VALV comprises obtaining the load factor parameters from a main control and monitoring system of the structural system absent actual load values from the actuator.

3. The method of claim 2, wherein obtaining the load factor parameters comprises obtaining at least one of an amount of gravitational force on structural system component, a surface deflection of the component and a speed at which the structural system is moving.

4. The method of claim 2, wherein the structural system is an aircraft and the structural system component comprises an aircraft control surface, and wherein obtaining the load factor parameters comprises obtaining at least one of an amount of an angle of attack, a surface deflection of the control surface and a speed at which the aircraft is moving.

5. The method of claim 1, wherein determining the VOFV comprises obtaining actuator operational control values from an actuator control and monitoring system.

6. The method of claim 5, wherein obtaining the actuator operation parameters comprises obtaining at least one of a pulse width modulation (PWM) command to an actuator drive motor, a rotational speed of the drive motor and an applied voltage to the drive motor.

7. The method of claim 1, wherein calculating the VTE comprises dividing the VALV by the VOFV.

8. The method of claim 1, wherein calculating the VTE comprises dividing the VALV by the VOFV and filtering the quotient to compensate for at least one of aiding loads and resisting loads on the structural system component.

9. A method for monitoring the reliability status of a mobile platform actuator that controls movement of a control surface of the mobile platform, said method comprising:
  acquiring various measured load factor parameters acting on a mobile platform including a control surface operably connected to the actuator, the measured load factor parameters acquired from a mobile platform main control and monitoring system (MCMS) absent measured load values acting on the actuator;
  acquiring various measured actuator operational control values from an actuator control and monitoring system, the operational control values occurring in response to a torque command transmitted from the mobile platform MCMS to the actuator during operation of the actuator;
  determining a virtual actuator load value (VALV) based on the various measured load factor parameters;
  determining a virtual output force value (VOFV) based on the various measured actuator operational control values; and
  calculating a virtual torque efficiency (VTE) of the actuator by comparing the VALV and the VOFV; and
  storing the VTE in a computer readable database for future access, analysis and determination of a reliability status of the actuator.

10. The method of claim 9, wherein obtaining the load factor parameters comprises obtaining at least one of an amount of gravitational force on the control surface, an amount of deflection of the control surface and a speed at which the mobile platform is moving.

11. The method of claim 9, wherein the mobile platform is an aircraft and obtaining the load factor parameters comprises obtaining at least one of an amount of an angle of attack, a surface deflection of the control surface and a speed at which the aircraft is moving.

12. The method of claim 9, wherein obtaining the actuator operation parameters comprises obtaining at least one of a pulse width modulation (PWM) command to an actuator drive motor, a rotational speed of the drive motor and an applied voltage to the drive motor.

13. The method of claim 9, wherein calculating the VTE comprises dividing the VALV by the VOFV.

14. The method of claim 9, wherein calculating the VTE comprises dividing the VALV by the VOFV and filtering the quotient to compensate for at least one of aiding loads and resisting loads on the structural system component.

15. The method of claim 9, wherein the method further comprises:
  acquiring a plurality of VTE data by periodically calculating the VTE as the measured load factor parameters and the measured actuator operational control values change during operation of the mobile platform;
  storing and analyzing the VTE data to monitor the reliability status of the actuator.

16. A system for monitoring the reliability status of a mobile platform actuator that controls movement of a control surface of the mobile platform, said system comprising:
  a mobile platform main control and monitoring system (MCMS); and
  an actuator efficiency monitor module operable in cooperation with the MCMS, the actuator efficiency monitor module adapted to:
    acquire various measured load factor parameters acting on a mobile platform including a control surface operably connected to the actuator, the measured load factor parameters acquired from the MCMS absent measured load values acting on the actuator;
    acquire various measured actuator operational control values from an actuator control and monitoring system, the operational control values occurring in response to a torque command transmitted from the mobile platform MCMS to the actuator during operation of the actuator;
    determine a virtual actuator load value (VALV) based on the various measured load factor parameters;
    determine a virtual output force value (VOFV) based on the various measured actuator operational control values;
    calculate a virtual torque efficiency (VTE) of the actuator by dividing the VALV by the VOFV;
    acquire a plurality of VTE data by periodically calculating the VTE as the measured load factor parameters and the measured actuator operational control values change during operation of the mobile platform; and
    store the VTE data for monitoring the reliability status of the actuator.

17. The system of claim 16, wherein the load factor parameters comprise at least one of an amount of gravitational force on the control surface, an amount of deflection of the control surface and a speed at which the mobile platform is moving.

18. The system of claim 16, wherein the mobile platform is an aircraft and the load factor parameters comprise at least one of an amount of an angle of attack, a surface deflection of the control surface and a speed at which the aircraft is moving.

19. The system of claim 16, wherein the actuator operation parameters comprise at least one of a pulse width modulation (PWM) command to an actuator drive motor, a rotational speed of the drive motor and an applied voltage to the drive motor.

20. The system of claim 16, wherein the actuator efficiency monitor module is further adapted to filter the quotient of the VALV divided by the VOFV to compensate for at least one of aiding loads and resisting loads on the structural system component.

* * * * *